United States Patent Office 3,704,241
Patented Nov. 28, 1972

3,704,241
4-PYRAZOLE ACETIC ACID COMPOUNDS
Shunsaku Noguchi and Shoji Kishimoto, Osaka, Japan, assignors to Takeda Chemical Industries, Ltd., Higashi-ku, Osaka, Japan
No Drawing. Filed Nov. 17, 1970, Ser. No. 90,421
Claims priority, application Japan, Nov. 17, 1969,
44/91,901
Int. Cl. C07d 49/18
U.S. Cl. 260—310 R                 8 Claims

ABSTRACT OF THE DISCLOSURE 4-pyrazole acetic acid or esters thereof of the formula:

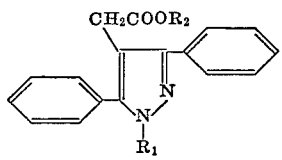

(I)

wherein $R_1$ is hydrogen, lower alkyl, aryl or aralkyl, the aromatic ring of the said aryl or aralkyl being substituted or unsubstituted, and $R_2$ is hydrogen or alkyl are prepared by reacting a $\beta,\beta$-dibenzoylpropionate of the formula:

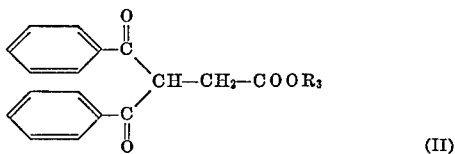

(II)

wherein $R_3$ represents alkyl, with a hydrazine of the formula:

$$R_1\text{—NHNH}_2 \qquad (III)$$

wherein $R_1$ has the same meaning as above, and, if desired, hydrolyzing the thus obtained compound. The compounds possess anti-inflammatory and analgesic action.

---

This invention relates to novel 3,5-diphenyl-4-pyrazole acetic acid and 1-substituted derivatives or esters thereof which have an excellent antiinflammatory and analgesic activity and which are represented by the formula:

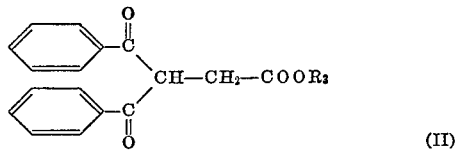

(I)

wherein $R_1$ is hydrogen, lower alkyl, or aryl or aralkyl, the aromatic ring of the aryl or aralkyl being substituted or unsubstituted, and $R_2$ is hydrogen or alkyl and to the method for production thereof.

The compounds of the Formula I are produced by reacting a $\beta,\beta$-dibenzoylpropionate represented by the general formula:

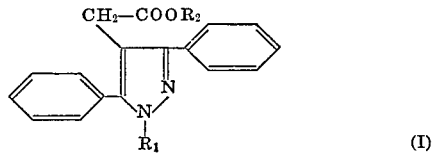

(II)

wherein $R_3$ is alkyl, with a hydrazine compound represented by the general formula:

$$R_1\text{—NHNH}_2 \qquad (III)$$

wherein $R_1$ has the same meaning as above, then hydrolyzing the obtained compound, if desired.

As to the production of the starting material, $\beta,\beta$-dibenzoylpropionate of the Formula II, there has been reported a method in which dibenzoylmethane and ethyl iodoacetate are treated with sodium in ethanol (Journal of the Chemical Society 101 996 (1912)) and another method in which ethyl $\beta$-benzoylpropionate and benzoyl chloride are treated with sodium ethoxide in ether (Justus Liebigs Annalen der Chemie 347 89 (1906)).

$\beta,\beta$-Dibenzoylpropionate of the Formula II is easily produced by, for example, reacting dibenzoyl methane and bromoacetate represented by the general formula:

$$\text{Br—CH}_2\text{—COOR}_3 \qquad (IV)$$

wherein $R_3$ have the same meaning as above, with metallic sodium in toluene.

Referring to the above-mentioned general Formulas I and III, examples of lower alkyl represented by $R_1$ are methyl, ethyl, propyl, isopropyl, butyl, isobutyl, and examples of aryl and aralkyl represented by $R_1$ are those such as mono- and di-cyclic carbocyclic and mono-cyclic carbocyclic lower alkyl, e.g., phenyl, $\alpha$-naphthyl, $\beta$-naphthyl, benzyl and phenethyl, and the said aryl and aralkyl may be unsubstituted or have one or more substituents such as lower alkyl, e.g., methyl, ethyl, propyl, isopropyl, butyl or isobutyl, lower alkoxy, e.g., methoxy, ethoxy, propoxy, or halogen i.e., fluorine, chlorine, bromine and iodine. It will be appreciated that where $R_2$ is alkyl, said group corresponds to the alkyl group $R_3$ present in the starting material of Formula II. Examples to alkyl represented by $R_2$ and $R_3$ in the general Formula I or II are lower alkyl, e.g., methyl, ethyl, propyl, isopropyl, butyl, isobutyl, etc.

To produce the compounds of the Formula I wherein $R_2$ is alkyl and $R_1$ has the same meaning as mentioned above, a compound (II) is reacted with a compound (III) advantageously in the presence of an inert organic solvent. As the said solvent, there may, for example, be employed fatty acids, alcohols and the like. Especially, lower fatty acid, e.g., acetic acid or propionic acid, is desirably employable. The reaction may proceed at room temperature, but it is possible to conduct the reaction under heating for the purpose of accelerating the reaction. The hydrazine compounds of the Formula III are employable in a form of salt such as hydrochloride or sulfate. In such a case, it is preferable to carry out the reaction in the presence of deacidifying agent such as sodium carbonate, potassium carbonate, sodium bicarbonate, potassium bicarbonate, sodium acetate or potassium acetate. The product may be taken out and purified by means of a conventional manner such as distillation under reduced pressure or recrystallization.

To obtain the compounds of the Formula I wherein $R_2$ is hydrogen and $R_1$ has the same meaning as mentioned above, the compounds of the Formula I wherein $R_2$ is alkyl and $R_1$ has the same meaning as above are subjected to hydrolysis with or without isolation step. The hydrolysis is carried out, for example, by employing acid or alkali catalyst in an aqueous alcohol or the like as a solvent.

The compounds produced by the foregoing manner may be converted, if necessary, to salts thereof with an organic or inorganic base. Examples of the said salts are organic amine salts, sodium salts, potassium salts, aluminum salts, and ammonium salts.

The objective compounds of this invention are novel and have superior antiinflammatory and analgesic action, and can be generally administered orally in a form of tablet, powder, capsule, liquid, etc., or by way of injection or suppository.

An effective dose of the compound of this invention, when administered orally to adult human, is usually about 0.01 g. to 0.5 g. a day, desirably 0.01 g. to 0.2 g.

a day, and when administered intravenously, it is usually about 0.01 g. to 0.1 g. per dose desirably 0.01 g. to 0.05 g. per dose. Of course, an increased or reduced dose is also effective depending on symptoms.

The physiological activity of the compound of this invention is demonstrated in the following tests.

TEST FOR ANTI-INFLAMMATORY ACTIVITY

Carrageenin edema

Male rats, each group consisting of 6 heads, weighing 190±10 g. and 6 weeks in age were tested according to the method of Winter et al. (Proceeding of the Society for Experimental Biology and Medicine 111, p. 544, (1962)). After the measurement of the volume of a right hind paw, the test compounds in volume of 5 ml. were orally administered with 5 ml. of water. One hour thereafter, 0.05 ml. of 1% carrageenin suspended in physiological saline was injected subcutaneously to the right hind paw. After the administration of the test compounds, when the edema of the hind paw caused by the carrageenin injection was maximal, the volume of the hind paw was reestimated. The percent inhibition of the edema by test compounds was obtained by comparison with that of the control group.

TEST FOR ACUTE TOXICITY

(Median lethal dose)

Each compound suspended with 4% gum Arabic acacia in physiological saline was administered intraperitoneally to male mice consisting of 6 a group and weighing 20±2 g. each of the body weight, the condition of the mice was observed daily for 7 days, and the mortality was calculated in 7 days after the injection.

Reference 2

The same treatment described in Reference 1 is carried out by employing methyl bromoacetate in place of ethyl bromoacetate to give methyl $\beta,\beta$-dibenzoylpropionate melting at 125–127° C.

*Elementary Analysis.*—Calculated for $$C_{18}H_{14}O_4 = 296.33$$

(percent): C, 72.97; H, 5.44. Found (percent): C, 72.91; H, 5.41.

EXAMPLE 1

To a solution of 3.1 parts by weight of ethyl $\beta,\beta$-dibenzoylpropionate in 15 parts by volume of acetic acid 0.625 part by weight of 80% aqueous solution of hydrazine hydrate is added dropwise with stirring at room temperature. The resultant solution is heated at 80° C. on a water bath and stirred for 3 hours. After cooling, the reaction mixture is poured into a large amount of water, then neutralized with sodium bicarbonate to give precipitates, followed by extraction with ethyl acetate. The ethyl acetate layer is washed with water and dried, followed by the removal of the solvent by the distillation under reduced pressure. The residue is recrystallized from ligroin to give ethyl 3,5-diphenyl-4-pyrazole acetate as colorless crystals melting at 117–119° C.

*Elementary Analysis.*—Calculated for $$C_{19}H_{18}N_2O_2 = 306.35$$

(percent): C, 74.49; H, 5.92; N, 9.15. Found (percent): C, 74.45; H, 5.83; N, 9.24.

2.0 parts by weight of thus obtained ethyl 3,5-diphenyl-4-pyrazole acetate is dissolved in a mixture of 20 parts by volume of ethanol and 20 parts by volume of a 20%

TABLE 1

| Compound | Dose (mg./kg.) | Rate of inhibition, percent | LD$_{50}$ (mg./kg.) |
|---|---|---|---|
| 3,5-diphenyl-4-pyrazole acetic acid | 150 | 21.5 | >500 |
| 1,3,5-triphenyl-4-pyrazole acetic acid | 6.0 | [1] 41.6 | ≧125 |
| Methyl 1,3,5-triphenyl-4-pyrazole acetate | 3.12 | 16.2 | |
| Ethyl 1,3,5-triphenyl-4-pyrazole acetate | 6.49 | [1] 31.8 | |
| 3,5-diphenyl-1-(o-tolyl)-4-pyrazole acetic acid | 75 | [1] 29.3 | >500 |
| 1-(p-chlorophenyl)-3,5-diphenyl-4-pyrazole acetic acid | 75 | [1] 38.4 | ≧250 |
| 1-(p-bromophenyl)-3,5-diphenyl-4-pyrazole acetic acid | 100 | [1] 40.9 | ≧500 |
| 3,5-diphenyl-1-(p-methoxyphenyl)-4-pyrazole acetic acid | 100 | 24.8 | ≧500 |
| 3,5-diphenyl-1-(a-naphthyl)-4-pyrazole acetic acid | 75 | [2] 19.7 | ≧250 |

[1] P <0.01.
[2] P <0.05.

NOTE.—P=probability.

Throughout the specification, "kg.," "g.," "mg." and "ml." stand for "kilogram(s)," "gram(s)," "milligram(s)" and "milliliter(s)" respectively.

The present invention is further explained by way of the following illustrative examples.

In the following references and examples, the relationship between part(s) by weight and part(s) by volume is the same as that between gram(s) and milliliter(s).

Reference 1

8.1 parts by weight of metallic sodium is heated in 105 parts by volume of xylene and shaken vigorously to give fine granule. Then, xylene is replaced with 70 parts by volume of dry toluene, followed by adding 78.6 parts by weight of dibenzoylmethane in 320 parts by volume of dry toluene dropwise. The mixture is refluxed for about 1 hour. Subsequently 58.6 parts by weight of ethyl bromoacetate is added dropwise, thereto under refluxing. The reflux is further continued for 10 hours. After cooling, the reaction mixture is poured into water, and the reaction product is extracted with ethyl acetate. The ethyl acetate layer is washed with water and dried. The solvent is distilled off under reduced pressure. The residue is dissolved in 10 parts by volume of methanol and kept standing under cooling to give 75.2 parts by weight of ethyl $\beta,\beta$-dibenzoylpropionate as pale orange crystals melting at 82–83° C.

aqueous solution of sodium hydroxide, and the resultant solution is refluxed for 6 hours on a water bath. After cooling, the reaction mixture is concentrated under reduced pressure, and is admixed with water, followed by neutralization with concentrated hydrochloric acid under cooling with ice water. The crystals precipitated are collected by filtration, washed with water and dried under reduced pressure. The product is recrystallized from 50 parts by volume of ethyl acetate to give 3,5-diphenyl-4-pyrazole acetic acid as colorless crystals melting at 206–208° C. (The crystals contain ½ molecule of ethyl acetate as a solvent of crystallization.)

*Elementary Analysis.*—Calculated for $$C_{17}H_{14}N_2O_2 \cdot \tfrac{1}{2} C_4H_8O_2 = 322.35$$

(percent): C, 70.79; H, 5.63; N, 8.69. Found (percent): C, 71.40; H, 5.66; H, 8.96.

EXAMPLE 2

2.9 parts by weight of methylhydrazine sulfate, 6.2 parts by weight of ethyl $\beta,\beta$-dibenzoylpropionate and 3.4 parts by weight of sodium bicabonate are dissolved in 40 parts by volume of acetic acid, and the solution is stirred at 80° C. on a water bath. The reaction mixture is poured into water, followed by neutralization with sodium bicarbonate. The resulting oily substance is subjected to extraction with ethyl acetate. The ethyl acetate layer is washed with water and dried. The solvent is distilled off under reduced pressure. The residue is subjected to fractional distillation under reduced pressure, and the fraction showing the boiling point at 211° C./1 mm. Hg is collected. 4.0 parts by weight of the product is dissolved in a mixture of 40 parts by volume of ethanol and 40 parts by volume of a 20% aqueous solution of sodium hydroxide, and the resulting solution is subjected to the reflux for 6 hours on a water bath. After cooling, the reaction mixture is concentrated under reduced pressure, and is neutralized with diluted hydrochloric acid under cooling. The resulting precipitate is extracted with ethyl acetate. The ethyl acetate layer is washed with water and dried. The solvent is removed by the distillation under reduced pressure. The residue is recrystallized from 10 parts by volume of benzene to give 1-methyl-3,5-diphenyl-4-pyrazole acetic acid as colorless crysttals melting at 166–168° C.

*Elementary Analysis.*—Calculated for $C_{18}H_{16}N_2O_2=$ 292.32 (percent): C, 73.95; H, 5.52; N, 9.58. Found (percent): C, 73.78; H, 5.61; N, 9.63.

EXAMPLE 3

1.1 part by weight of phenylhydrazine and 3.1 parts by weight of ethyl $\beta,\beta$-dibenzoylpropionate are dissolved in 15 parts by volume of acetic acid, and the solution is stirred for 2.5 hours at 60–80° C. on a water bath. After cooling, the reaction mixture is poured into water, then neutralized with sodium bicarbonate, followed by extraction with ethyl acetate. The ethyl acetate layer is washed with water and dried. The solvent is removed by distillation under reduced pressure. The residue is purified by column chromatography and objective fraction is distilled under reduced pressure to give ethyl 1,3,5-triphenyl-4-pyrazole acetate as colorless oil boiling at 232° C./0.9 mm. Hg.

*Elementary Analysis.*—Calculated for $C_{25}H_{22}N_2O_2=$ 382.44 (percent): C, 78.51; H, 5.80; N, 7.33. Found (percent): C, 78.84; H, 5.89; N, 7.31.

To 3.0 parts by weight of the product thus obtained are added 40 parts by volume of ethyl alcohol and 40 parts by volume of a 20% aqueous solution of sodium hydroxide, and the resulting solution is subjected to reflux for 6 hours. After cooling, the reaction mixture is admixed with water, followed by the concentration under reduced pressure and neutralization with concentrated hydrochloric acid. The resulting precipitate is extracted with ethyl acetate. The ethyl acetate layer is washed with water and dried, followed by the removal of the solvent by distillation under reduced pressure. The residue is washed with petroleum ether, and recrystallized from 45 parts by voume of methyl alcohol to give 1,3,5-triphenyl-4-pyrazole acetic acid as colorless crystals melting at 208°–210° C.

*Elementary Analysis.*—Calculated for $C_{23}H_{18}N_2O_2=$ 354.39 (percent): C, 77.95; H, 5.12; N, 7.91. Found (percent): C, 78.26; H, 5.28; N, 7.82.

EXAMPLE 4

1.9 part by weight of p-methoxybenzylhydrazine hydrochloride, 3.1 parts by weight of ethyl $\beta,\beta$-dibenzoylpropionate and 0.84 part by weight of sodium bicarbonate are dissolved in 20 parts by volume of acetic acid, and the solution is stirred for 8 hours at 80° C. on a water bath. After cooling, the reaction mixture is poured into water, then neutralized with sodium bicarbonate, followed by extraction with ethyl acetate. The ethyl acetate layer is washed with water and dried. The solvent is distilled off under reduced pressure. To the residue is added petroleum ether to give crystals. The crystals collected by filtration are recrystallized from 120 parts by volume of n-hexane, whereby ethyl 1-(p-methoxybenzyl)-3,5-diphenyl-4-pyrazole acetate is obtained as colorless crystals melting at 91°–93° C.

*Elementary Analysis.*—Calculated for $C_{27}H_{26}N_2O_3=$ 426.49 (percent): C, 76.03; H, 6.15; N, 6.57. Found (percent): C, 76.00; H, 6.29; N, 6.74.

2.4 parts by weight of thus obtained product is dissolved in a mixture of 30 parts by volume of ethyl alcohol and 30 parts by volume of a 20% aqueous solution of sodium hydroxide, and the solution is subjected to reflux for 6 hours. After cooling, the reaction mixture is admixed with water and filtered. The filtrate is concentrated under reduced pressure and is neutralized with concentrated hydrochloric acid under cooling. The resulting crystalline precipitate is collected by filtration, washed with water and dried under reduced pressure. The crystals are recrystallized from a mixture of 30 parts by volume of benzene and 20 parts by volume of n-hexane, whereby 1-(p-methoxybenzyl)-3,5-diphenyl-4-pyrazole acetic acid is obtained as colorless crystals melting at 142–145° C.

*Elementary Analysis.*—Calculated for $C_{25}H_{22}N_2O_3=$ 398.44 (percent): C, 75.36; H, 5.57; N, 7.03. Found (percent): C, 75.45; H, 5.57; N, 6.99.

EXAMPLE 5

To 20 parts by volume of acetic acid are added 1.8 part by weight of p-chlorophenylhydrazine hydrochloride, 3.1 parts by weight of ethyl $\beta,\beta$-dibenzoylpropionate and 0.9 part by weight of sodium bicarbonate, and the mixture is stirred for 8 hours at 80° C. on a water bath. After cooling, the reaction mixture is poured into a large amount of water, followed by being neutralized with sodium bicarbonate. The resulting precipitate is extracted with ethyl acetate. The ethyl acetate layer is washed with water and dried. The solvent is distilled off under reduced pressure. To the residue is added 50 parts by volume of n-hexane, and the mixture is heated and followed by filtration. The filtrate is kept standing overnight. Unreacted ethyl $\beta,\beta$-dibenzoylpropionate precipitated is removed by filtration, and the filtrate is subjected to distillation under reduced pressure. To the residue are added 30 parts by volume of ethanol and 10 parts by volume of a 50% aqueous solution of potassium hydroxide, and the mixture is subjected to reflux for 4 hours on a water bath. After cooling, the reaction mixture is concentrated under reduced pressure at 35° C. and diluted with water. The mixture is acidified with hydrochloric acid. The resulting precipitate is collected by filtration, and then is dissolved in ethyl acetate, washed with water and dried with sodium sulfate. The ethyl acetate is removed off by distillation under reduced pressure. The residue is washed with petroleum ether and recrystallized from methanol, whereby 1 - (p - chlorophenyl)-3,5-diphenyl-4-pyrazole acetic acid is obtained as colorless crystals melting at 191–195° C.

*Elementary Analysis.*—Calculated for $C_{22}H_{17}N_2ClO_2=$ 388.86 (percent): C, 71.03; H, 4.41; N, 7.20. Found (percent): C, 70.98; H, 4.37; N, 6.91.

EXAMPLE 6

To 30 parts by volume of acetic acid are added 1.6 part by weight of o-tolylhydrazine hydrochloride, 3.1 parts by weight of ethyl $\beta,\beta$-dibenzoylpropionate and 0.9 part by weight of sodium bicarbonate, and the mixture is stirred for 8 hours at 80° C. on a water bath. After cooling, the reaction mixture is poured into a large amount of water, then neutralized with sodium bicarbonate, followed by extraction with ethyl acetate, dried with magnesium sulfate. The solvent is distilled off under reduced pressure. To the residue is added n-hexane, and the mixture is kept standing for a while. The resulting precipitate is collected by filtration, and is recrystallized from 20 parts by volume of ethanol to give crystals of ethyl 1-(o-tolyl)-3,5-diphenyl-4-pyrazole acetate which contains a small amount of unreacted ethyl $\beta,\beta$-dibenzoylpropionate. The crude crystals are dissolved in a solution of 30 parts by volume of ethanol and 10 parts by volume of 50% aqueous solution of potassium hydroxide. The mixture is heated under refluxing for 6 hours. After cooling, the reaction mixture is concentrated under reduced pressure at 35° C. Water is added to the residue, and the mixture is acidified with hydrochloric acid. The resulting precipitate is extracted with ethyl acetate, and the ethyl acetate layer is washed with water and dried with sodium sulfate. The solvent is distilled off under reduced pressure. Petroleum ether is added to the residue. The resutling precipitate is collected by filtration and is recrystallized from 40 parts by volume of benzene, whereby 1-(o-tolyl)-3,5-diphenyl-4-pyrazole acetic acid is obtained as colorless crystals melting at 196-199° C.

*Elementary Analysis.*—Calculated for $C_{24}H_{20}N_2O_2=$ 368.42 (percent): C, 78.24; H, 5.47; N, 7.60. Found (percent): C, 78.43; H, 5.50; N, 7.71.

EXAMPLE 7

To 20 parts by volume of acetic acid are added 1.05 part by weight of p-methoxyphenylhydrazine hydrochloride, 1.86 part by weight of ethyl β,β-dibenzoylpropionate and 0.55 part by weight of sodium bicarbonate, and the mixture is stirred for 8 hours at 60° C. on a water bath. After cooling, the reaction mixture is poured into water, then neutralized with sodium bicarbonate, followed by extraction with ethyl acetate. The ethyl acetate layer is dried with magnesium sulfate, and then the solvent is distilled off under reduced pressure. The residue is subjected to column chromatography on silica gel (300 parts by weight) with chloroform as an eluent, whereby 1.8 part by weight of a mixture of ethyl 1-(p-methoxyphenyl)-3,5-diphenyl-4-pyrazole acetate and a small amount of ethyl β,β-dibenzoylpropionate is obtained. To the mixture are added 20 parts by volume of hydrochloric acid and 20 parts by volume of water, and then the mixed solution is heated under refluxing for 5 hours. After cooling, the reaction mixture is subjected to extraction with ethyl acetate. The ethyl acetate layer is washed with water and dried with sodium sulfate. The solvent is distilled off under reduced pressure. To the residue are added n-hexane and benzene. The resulting precipitate is collected by filtration and recrystallized from 60 parts by volume of benzene, whereby colorless crystals of 1-(p-methoxyphenyl)-3,5-diphenyl-4-pyrazole acetic acid are obtained. Melting point 190-193° C.

*Elementary Analysis.*— Calculated for $C_{24}H_{20}N_2O_3=$ 384.42 (percent): C, 74.98; H, 5.24; N, 7.29. Found (percent): C, 75.24; H, 5.19; N, 7.33.

EXAMPLE 8

To 30 parts by volume of acetic acid are added 1.95 part by weight of α-naphthylhydrazine hydrochloride, 3.1 parts by weight of ethyl β,β-dibenzoylpropionate and 0.9 part by weight of sodium bicarbonate, and the mixture is stirred for 8 hours at 60° C. on a water bath. After cooling, the reaction mixture is poured into a large amount of water, then neutralized with sodium bicarbonate, followed by extraction with ethyl acetate. The ethyl acetate layer is dried with magnesium sulfate, and the solvent is distilled off under reduced pressure. To the residue are added n-hexane and benzene, and the mixture is kept standing for a while. The resulting brown-yellow precipitate is collected by filtration and recrystallized from 20 parts by volume of ethanol, whereby ethyl 1-(α-naphthyl)-3,5-diphenyl-4-pyrazole acetate is obtained as colorless crystals melting at 135-138° C.

*Elementary Analysis.*—Calculated for $C_{29}H_{24}N_2O_2=$ 432.50 (percent): C, 80.53; H, 5.59; N, 6.48. Found (percent): C, 80.60; H, 5.69; N, 6.49.

1.73 part by weight of the ester obtained above is added to a mixture of 30 parts by volume of ethanol and 10 parts by volume of 50% aqueous solution of potassium hydroxide. The mixture is heated under refluxing for 6 hours. After cooling, the reaction mixture is concentrated under reduced pressure at 40° C. and diluted with water, then acidified with hydrochloric acid. The resulting precipitate is extracted with ethyl acetate. The ethyl acetate layer is dried with sodium sulfate, and the solvent is distilled off under reduced pressure. To the residue are added n-hexane and a small amount of ether. The mixture is shaken up and the resulting precipitate is collected by filtration, and recrystallized from 25 parts by volume of acetonitrile, whereby 1-(α-naphthyl)-3,5-diphenyl-4-pyrazole acetic acid is obtained as colorless crystals melting at 105-108° C. (The crystals contain ½ molecule of acetonitrile as a solvent of crystallization.)

*Elementary Analysis.*—Calculated for $$C_{27}H_{20}N_2O_2 \cdot \tfrac{1}{2}CH_3CN = 424.98$$

(percent): C, 79.13; H, 5.10; N, 8.24. Found (percent): C, 78.64; H, 5.12; N, 8.20.

EXAMPLE 9

To 30 parts by volume of acetic acid are added 3.4 parts by weight of p-bromophenylhydrazine hydrochloride, 3.1 parts by weight of ethyl β,β-dibenzoylpropionate and 1.3 part by weight of sodium bicarbonate, and the mixture is stirred for 8 hours at 60-70° C. on a water bath. After cooling, the reaction mixture is poured into a large amount of water, then neutralized with sodium bicarbonate, followed by extraction with ethyl acetate. The ethyl acetate layer is washed with water and dried with sodium sulfate. The solvent is distilled off under reduced pressure. To the residue are added 60 parts by volume of ethanol and 20 parts by volume of 50% aqueous solution of potassium hydroxide, and the mixture is heated under refluxing for 6 hours. After cooling, the reaction mixture is concentrated under reduced pressure at 35° C. and diluted with water. The mixture is acidified with hydrochloric acid to give precipitate. The precipitate is extracted with ethyl acetate, washed with water and dried with magnesium sulfate. The solvent is distilled off under reduced pressure. The residue is recrystallized from 200 parts by volume of benzene, whereby 1-(p-bromophenyl) - 3,5-diphenyl-4-pyrazole acetic acid is obtained as colorless crystals, melting at 197-199° C.

*Elementary Analysis.*—Calculated for $$C_{23}H_{17}N_2BrO_2 = 433.32$$

(percent): C, 63.76; H, 3.96; N, 6.47. Found (percent): C, 63.93; H, 3.95; N, 6.27.

EXAMPLE 10

1.1 part by weight of phenyl hydrazine and 3.0 parts by weight of methyl β,β-dibenzoyl propionate are dissolved in 15 parts by volume of acetic acid, and the solution is stirred for 2.5 hours at 60-70° C. on a water bath. After cooling, the reaction mixture is poured into water, then neutralized with sodium bicarbonate, followed by extraction with ethyl acetate. The ethyl acetate layer is washed with water and dried. The solvent is removed by distillation under reduced pressure. The residue is recrystallized from 50 parts by volume of n-hexane to give methyl 1,3,5-triphenyl-4-pyrazole acetate as colorless crystals melting at 90-93° C.

*Elementary Analysis.*—Calculated for $$C_{24}H_{20}N_2O_2 = 368.44$$

(percent): C, 78.26; H, 5.47; N, 7.61. Found (percent): C, 78.57; H, 5.41; N, 7.47.

This methyl ester is hydrolyzed with sodium hydroxide in aqueous ethyl alcohol to 1,3,5-triphenyl-4-pyrazole acetic acid in a similar manner to that described in Example 3.

What is claimed is:
1. A compound of the formula

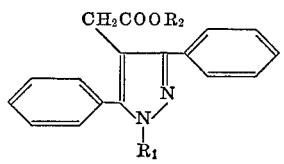

wherein $R_1$ is hydrogen, lower alkyl, phenyl, phenyl monosubstituted with lower alkyl, lower alkoxy or halogen, naphthyl, phenyl lower alkyl or phenyl lower alkyl alkyl wherein the phenyl ring is monosubstituted with lower alkyl, lower alkoxy or halogen, and $R_2$ is hydrogen or lower alkyl.

2. A compound as in claim 1 wherein $R_2$ is hydrogen.
3. A compound as in claim 2, said compound being 1-(p-chlorophenyl)-3,5-diphenyl-4-pyrazole acetic acid.
4. A compound as in claim 2, said compound being 1-(p-bromophenyl)-3,5-diphenyl-4-pyrazole acetic acid.
5. A compound as in claim 2, said compound being 1,3,5-triphenyl-4-pyrazole acetic acid.
6. A compound as in claim 1 wherein $R_2$ is lower alkyl.
7. A compound as in claim 6, said compound being methyl 1,3,5-triphenyl-4-pyrazole acetate.
8. A compound as in claim 6, said compound being ethyl 1,3,5-triphenyl-4-pyrazole acetate.

References Cited

Abstract of British Pat. 558,774 Chem. Abst. vol. 41, column 488 (1947).
Bettinetti et al.; Chem. Abst. vol. 61, columns 3090–1 (1964).
Chemical Abstracts volumes 56–65, Seventh Collective Index, Subjects Ps–Sn, 19,077S (middle column) (1970).
Moritani et al.; Chem. Abst. vol. 70, No. 106427e (1969).
Sandstrom Chem. Abst. vol. 59, column 3929 (1963).

NATALIE TROUSOF, Primary Examiner

U.S. Cl. X.R.
260—469, 311; 424—273